(12) United States Patent
Lim et al.

(10) Patent No.: US 11,255,808 B2
(45) Date of Patent: Feb. 22, 2022

(54) CHEMI-CAPACITIVE SENSOR USING NANOMATERIAL AND METHOD OF MANUFACTURING SAME

(71) Applicant: GACHON UNIVERSITY INDUSTRY ACADEMIC COOPERATION FOUNDATION, Seongnam-si (KR)

(72) Inventors: Jae-Hong Lim, Seongnam-si (KR); Young Soo Yoon, Gwacheon-si (KR)

(73) Assignee: GACHON UNIVERSITY INDUSTRY ACADEMIC COOPERATION FOUNDATION, Seongnam-si (KR)

( * ) Notice: Subject to any disclaimer, the term of this patent is extended or adjusted under 35 U.S.C. 154(b) by 0 days.

(21) Appl. No.: 16/922,759

(22) Filed: Jul. 7, 2020

(65) Prior Publication Data

US 2021/0123878 A1    Apr. 29, 2021

(30) Foreign Application Priority Data

Oct. 23, 2019    (KR) .................. 10-2019-0132230

(51) Int. Cl.
*G01N 27/22*    (2006.01)

(52) U.S. Cl.
CPC ..... *G01N 27/221* (2013.01); *G01N 2027/222* (2013.01)

(58) Field of Classification Search
CPC .............. G01N 27/221; G01N 2027/222
See application file for complete search history.

(56) References Cited

U.S. PATENT DOCUMENTS

| | | | | |
|---|---|---|---|---|
| 2005/0227373 | A1* | 10/2005 | Flandre | G01N 27/221 436/518 |
| 2008/0093226 | A1* | 4/2008 | Briman | G01N 27/127 205/775 |
| 2011/0171629 | A1* | 7/2011 | Swager | G01N 33/54366 435/5 |
| 2011/0297541 | A1* | 12/2011 | Jayatissa | G01N 33/0052 204/406 |
| 2019/0285576 | A1* | 9/2019 | Naito | G01N 27/3276 |

FOREIGN PATENT DOCUMENTS

KR    1020090101906 A    9/2009

OTHER PUBLICATIONS

Vera Schroeder et al, Carbon Nanotube Chemical Sensors, Chemical Reviews, 2019, vol. 119, pp. 599-663, ACS Publicationas, Wasghinton DC, USA.

* cited by examiner

*Primary Examiner* — Tung X Nguyen
*Assistant Examiner* — Feba Pothen
(74) *Attorney, Agent, or Firm* — STIP Law Group, LLC

(57) ABSTRACT

Disclosed are a chemi-capacitive sensor using a nanomaterial and a method of manufacturing the same. The chemi-capacitive sensor includes a lower electrode including a conductor, an insulation part formed on the lower electrode and including an insulator, an upper electrode disposed on the insulation part and including a first electrode and a second electrode spaced apart from the first electrode, and a detection part disposed on the first electrode, the second electrode, and the insulation part between the first electrode and the second electrode and including at least one selected from the group consisting of a carbon nanomaterial and a metal-oxide-coated carbon nanomaterial. The chemi-capacitive sensor of the present invention is effective at selectively analyzing gas analytes.

19 Claims, 15 Drawing Sheets

Horizontal structure

Si wafer

SiO$_2$ deposition (300 nm) on Si wafer

Au/Cr deposition (180/20 nm) on SiO$_2$/Si wafer

SWNTs alignment

Vertical structure

Horizontal structure

CHEMI-CAPACITIVE SENSOR USING NANOMATERIAL AND METHOD OF MANUFACTURING SAME

CROSS REFERENCE TO RELATED APPLICATION

The present application claims priority based on Korean Patent Application No. 10-2019-0132230, filed on Oct. 23, 2019, the entire content of which is incorporated herein for all purposes by this reference.

BACKGROUND OF THE INVENTION

1. Technical Field

The present invention relates to a sensor and a method of manufacturing the same, and more particularly to a chemi-capacitive sensor using a nanomaterial and a method of manufacturing the same.

2. Description of the Related Art

There is the need to develop a gas detection system for warning people to take steps to improve air quality due to a wide variety of environmental problems, including air pollution. Real-time detection of toxic gases in a variety of fields requires low-cost gas sensors having high sensitivity, high selectivity and fast response/recovery time. Recently, unique materials, especially materials having chemical and electrical properties, including nanowires, nanofibers, nanoparticles and nanotubes, are being studied for use as sensor/transducer materials.

In particular, single-walled carbon nanotubes (SWNTs) are regarded as the most promising sensor/transducer material due to the intrinsic semiconductor electrical properties thereof and the presence of surface atoms. However, only a few gases, such as nitrogen dioxide ($NO_2$) and ammonia ($NH_3$), generate strong resistance reactions at low concentrations at room temperature, and most gases or vapors interact weakly with SWNTs to thus generate weak electrical resistance signals.

In order to overcome some limitations of SWNT-based sensors, many researchers have studied the chemical functionalization of SWNTs, have fabricated SWNT-based field-effect transistors, electrochemical resistors and chemiresistors, and have tested for reactions to various gases. Among these, a chemi-resistive sensor, operation of which varies depending on changes due to chemical adsorption of gas molecules, has been widely studied for use as a gas sensor. However, the selectivity of most devices is still unsatisfactory despite various attempts to improve the devices, and there is no selectivity when introducing mixed gas, which is undesirable.

SUMMARY OF THE INVENTION

Accordingly, an objective of the present invention is to provide a chemi-capacitive sensor capable of selectively analyzing gas analytes.

An aspect of the present invention provides a chemi-capacitive sensor, including: a lower electrode including a conductor; an insulation part formed on the lower electrode and including an insulator; an upper electrode disposed on the insulation part and including a first electrode and a second electrode spaced apart from the first electrode; and a detection part disposed on the first electrode, the second electrode, and the insulation part between the first electrode and the second electrode and including at least one selected from the group consisting of a carbon nanomaterial and a metal-oxide-coated carbon nanomaterial.

The chemi-capacitive sensor may further include a conductive wire, and the conductive wire may electrically connect the first electrode and the second electrode to each other.

The chemi-capacitive sensor may further include a capacitance measurement part, and the capacitance measurement part may be electrically connected to the conductive wire and to the lower electrode.

The detection part may include a network having the carbon nanomaterial, and the network may include the carbon nanomaterial aligned in a direction from any one electrode of the first electrode and the second electrode toward the remaining one thereof.

The carbon nanomaterial may include at least one selected from the group consisting of carbon nanotubes and carbon nanowires.

The carbon nanotubes may include at least one selected from the group consisting of single-walled carbon nanotubes, double-walled carbon nanotubes, and multiple-walled carbon nanotubes.

The carbon nanomaterial may include, on the surface thereof, at least one functional group selected from the group consisting of a hydroxyl group (—OH), a carbonyl group (—C=O), a carboxyl group (—COOH) and an amino group (—$NH_2$).

The metal oxide may include at least one selected from the group consisting of tin oxide ($SnO_2$), silicon dioxide ($SiO_2$), aluminum oxide ($Al_2O_3$), magnesium oxide (MgO), calcium oxide (CaO), zirconium silicate ($ZrSiO_4$), zirconium dioxide ($ZrO_2$), hafnium silicate ($HfSiO_4$), hafnium dioxide ($HfO_2$), yttrium oxide ($Y_2O_3$), strontium oxide (SrO), lanthanum oxide ($La_2O_3$), tantalum oxide ($Ta_2O_5$), barium oxide (BaO), titanium dioxide ($TiO_2$), zinc oxide (ZnO), ferric oxide ($Fe_2O_3$), tungsten trioxide ($WO_3$), copper oxide (CuO), copper peroxide ($CuO_2$), nickel oxide (NiO) and indium oxide ($In_2O_3$).

The chemi-capacitive sensor may detect at least one selected from the group consisting of hexane, ammonia, acetone, benzene, ethanol, methanol, toluene and o-xylene.

The chemi-capacitive sensor may detect a gaseous chemical.

The conductor of the lower electrode may include at least one selected from the group consisting of p-type silicon, n-type silicon, Au, Al, Ag, Be, Bi, Co, Cu, Cr, Cd, Fe, Ga, Hf, In, Ir, Mn, Mo, Mg, Ni, Nb, Pb, Pd, Pt, Rh, Re, Ru, Sb, Sn, Ta, Te, Ti, V, W, Zr and Zn.

The insulator may include at least one selected from the group consisting of silicon dioxide ($SiO_2$), aluminum oxide ($Al_2O_3$), silicon nitride ($Si_3N_4$), silicon oxynitride (SiON), magnesium oxide (MgO), calcium oxide (CaO), zirconium silicate ($ZrSiO_4$), zirconium dioxide ($ZrO_2$), hafnium silicate ($HfSiO_4$), hafnium dioxide ($HfO_2$), yttrium oxide ($Y_2O_3$), strontium oxide (SrO), lanthanum oxide ($La_2O_3$), tantalum oxide ($Ta_2O_5$), barium oxide (BaO) and titanium dioxide ($TiO_2$).

Each of the first electrode and the second electrode may independently include a chromium layer and a gold layer, in which chromium and gold are sequentially stacked, the chromium layer contacting the insulation part and the gold layer contacting the detection part.

The distance between the first electrode and the second electrode may be 1 to 10,000 μm.

The chemi-capacitive sensor may detect a target chemical by measuring the frequency at which the maximum value of a capacitance change ratio is shown when measuring the capacitance at different frequencies.

Capacitance change ratio=$(C-C_o)/C_o$ [Equation 1]

In Equation 1,
$C_o$ is the baseline capacitance, and
$C$ is the capacitance when the detection part is exposed to the target chemical.

Another aspect of the present invention provides a method of manufacturing a chemi-capacitive sensor, including: (a) providing a lower electrode including a conductor; (b) forming an insulation part including an insulator on the lower electrode; (c) forming an upper electrode including a first electrode and a second electrode spaced apart from the first electrode on the insulation part; (d) forming a detection part including at least one selected from the group consisting of a carbon nanomaterial and a metal-oxide-coated carbon nanomaterial on the first electrode, the second electrode, and the insulation part between the first electrode and the second electrode; and (e) forming a conductive wire that electrically connects the first electrode and the second electrode to each other.

The method may further include, after step (e), providing a capacitance measurement part electrically connected to the conductive wire and to the lower electrode.

Also, step (d) may include (d-1) preparing a suspension including a carbon nanomaterial by dispersing the carbon nanomaterial in a solvent, and (d-2) forming a detection part including the carbon nanomaterial by applying the suspension on the first electrode, the second electrode, and the insulation part between the first electrode and the second electrode.

Also, step (d-2) may include (d-2-1) applying the suspension on the first electrode, the second electrode, and the insulation part between the first electrode and the second electrode, and (d-2-2) forming a detection part by aligning the carbon nanomaterial contained in the applied suspension by applying a voltage to the applied suspension.

Also, step (d) may further include, after step (d-2), (d-3) applying droplets including a metal oxide precursor on the carbon nanomaterial applied on the insulation part, and (d-4) forming a detection part including a metal-oxide-coated carbon nanomaterial by oxidizing the metal oxide precursor contained in the droplets.

Also, the metal oxide precursor may be at least one precursor selected from the group consisting of tin oxide ($SnO_2$), silicon dioxide ($SiO_2$), aluminum oxide ($Al_2O_3$), magnesium oxide (MgO), calcium oxide (CaO), zirconium silicate ($ZrSiO_4$), zirconium dioxide ($ZrO_2$), hafnium silicate ($HfSiO_4$), hafnium dioxide ($HfO_2$), yttrium oxide ($Y_2O_3$), strontium oxide (SrO), lanthanum oxide ($La_2O_3$), tantalum oxide ($Ta_2O_5$), barium oxide (BaO) and titanium dioxide ($TiO_2$).

Also, the solvent may include at least one selected from the group consisting of dimethylformamide (DMF), dimethyl sulfoxide (DMSO), N-methylpyrrolidone (NMP), dimethylacetamide (DMA), monomethylformamide (MMF) and monomethylacetamide (MMA).

According to the present invention, the chemi-capacitive sensor is effective at selectively analyzing gas analytes.

DESCRIPTION OF SPECIFIC EMBODIMENTS

Figure 1A:
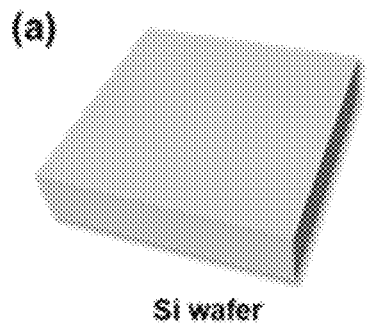
FIG. 1(a), FIG. 1(b), FIG. 1(c), FIG. 1(d) and FIG. 1(e) schematically shows a process of manufacturing a chemi-capacitive sensor according to the present invention.
Figure 1B:
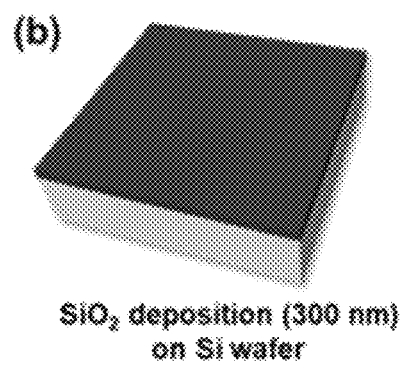
Figure 1C:
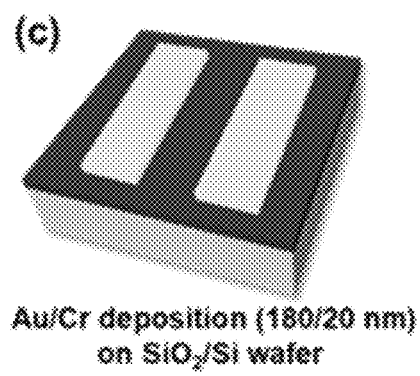
Figure 1D:
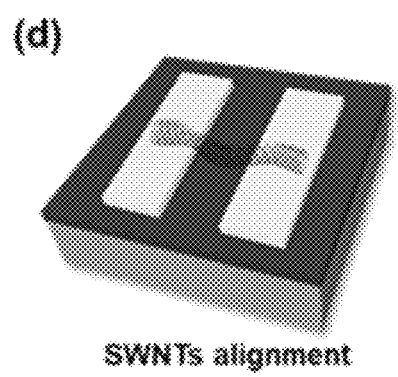
Figure 1E:
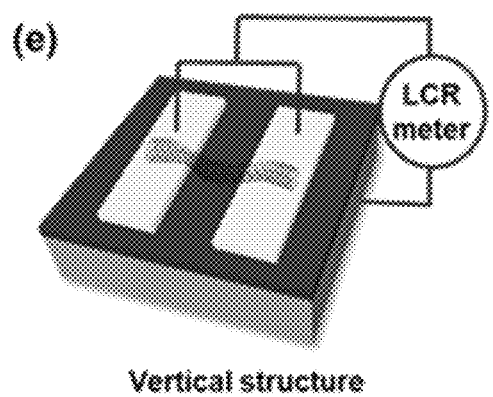
Figure 2:
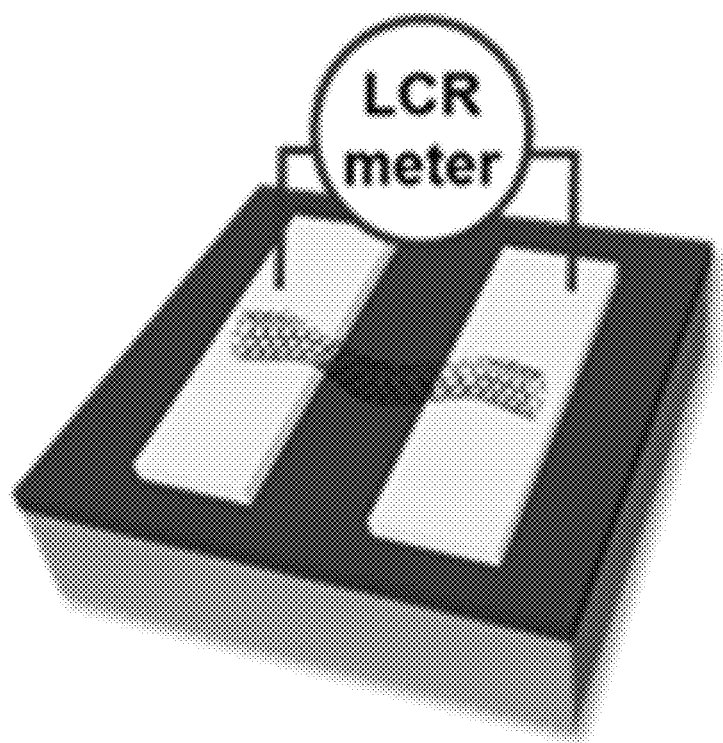
FIG. 2 schematically shows the configuration of a chemi-capacitive sensor having a horizontal structure manufactured in Comparative Example 1.

Hereinafter, exemplary embodiments of the present invention are described in detail with reference to the appended drawings so as to be easily performed by a person having ordinary skill in the art.

However, the following description does not limit the present invention to specific embodiments, and in the description of the present invention, detailed descriptions of related known techniques incorporated herein will be omitted when the same may make the gist of the present invention unclear.

The terms herein are used to explain specific embodiments, and are not intended to limit the present invention. Unless otherwise stated, a singular expression includes a plural expression. In the present application, the terms "comprise", "include" or "have" are used to designate the presence of features, numbers, steps, operations, elements, parts, or combinations thereof described in the specification, and should be understood as not excluding the presence or additional possible presence of one or more different features, numbers, steps, operations, elements, parts, or combinations thereof.

Hereinafter, a detailed description will be given of a chemi-capacitive sensor according to the present invention.

The present invention pertains to a chemi-capacitive sensor, including: a lower electrode including a conductor; an insulation part formed on the lower electrode and including an insulator; an upper electrode disposed on the insulation part and including a first electrode and a second electrode spaced apart from the first electrode; and a detection part disposed on the first electrode, the second electrode, and the insulation part between the first electrode and the second electrode and including at least one selected from the group consisting of a carbon nanomaterial and a metal-oxide-coated carbon nanomaterial.

Lower Electrode

The chemi-capacitive sensor of the present invention includes a lower electrode, and the lower electrode may include a conductor.

The conductor of the lower electrode may include at least one selected from the group consisting of p-type silicon, n-type silicon, Au, Al, Ag, Be, Bi, Co, Cu, Cr, Cd, Fe, Ga, Hf, In, Ir, Mn, Mo, Mg, Ni, Nb, Pb, Pd, Pt, Rh, Re, Ru, Sb, Sn, Ta, Te, Ti, V, W, Zr and Zn, and preferably includes p-type silicon.

Insulation Part

The chemi-capacitive sensor of the present invention includes an insulation part, and the insulation part may be formed on the lower electrode, and may include an insulator.

The insulator may include at least one selected from the group consisting of silicon dioxide ($SiO_2$), aluminum oxide ($Al_2O_3$), silicon nitride ($Si_3N_4$), silicon oxynitride (SiON), magnesium oxide (MgO), calcium oxide (CaO), zirconium silicate ($ZrSiO_4$), zirconium dioxide ($ZrO_2$), hafnium silicate ($HfSiO_4$), hafnium dioxide ($HfO_2$), yttrium oxide ($Y_2O_3$), strontium oxide (SrO), lanthanum oxide ($La_2O_3$), tantalum oxide ($Ta_2O_5$), barium oxide (BaO) and titanium dioxide ($TiO_2$), and preferably includes silicon dioxide ($SiO_2$).

Upper Electrode

The chemi-capacitive sensor of the present invention includes an upper electrode, and the upper electrode may be disposed on the insulation part, and may include a first electrode and a second electrode spaced apart from the first electrode.

Each of the first electrode and the second electrode may independently include at least one selected from the group consisting of p-type silicon, n-type silicon, Au, Al, Ag, Be, Bi, Co, Cu, Cr, Cd, Fe, Ga, Hf, In, Ir, Mn, Mo, Mg, Ni, Nb, Pb, Pd, Pt, Rh, Re, Ru, Sb, Sn, Ta, Te, Ti, V, W, Zr and Zn.

Each of the first electrode and the second electrode may independently include a chromium layer and a gold layer, in which chromium and gold are sequentially stacked, and the chromium layer may contact the insulation part and the gold layer may contact the detection part.

The distance between the first electrode and the second electrode may be 1 to 10,000 μm, preferably 1 to 100 μm, more preferably 1 to 10 μm, and even more preferably 1 to 5 μm. If the distance between the first electrode and the second electrode is less than 1 μm, it is not easy to control the distance between the electrodes. On the other hand, if the distance therebetween exceeds 10,000 μm, it is difficult to align the nanomaterial, which is undesirable.

Detection Part

The chemi-capacitive sensor of the present invention includes a detection part, and the detection part may be disposed on the first electrode, the second electrode, and the insulation part between the first electrode and the second electrode, and may include at least one selected from the group consisting of a carbon nanomaterial and a metal-oxide-coated carbon nanomaterial.

The detection part includes a network having the carbon nanomaterial, and the network may include the carbon nanomaterial aligned in a direction from any one electrode of the first electrode and the second electrode toward the remaining one thereof.

The carbon nanomaterial may include at least one selected from the group consisting of carbon nanotubes and carbon nanowires, and preferably includes carbon nanotubes.

The carbon nanotubes may include at least one selected from the group consisting of single-walled carbon nanotubes, double-walled carbon nanotubes, and multiple-walled carbon nanotubes, and preferably include single-walled carbon nanotubes.

The carbon nanomaterial may include, on the surface thereof, at least one functional group selected from the group consisting of a hydroxyl group (—OH), a carbonyl group (—C=O), a carboxyl group (—COOH) and an amino group (—$NH_2$), and preferably includes a carboxyl group (—COOH).

The metal oxide may include at least one selected from the group consisting of tin oxide ($SnO_2$), silicon dioxide ($SiO_2$), aluminum oxide ($Al_2O_3$), magnesium oxide (MgO), calcium oxide (CaO), zirconium silicate ($ZrSiO_4$), zirconium dioxide ($ZrO_2$), hafnium silicate ($HfSiO_4$), hafnium dioxide ($HfO_2$), yttrium oxide ($Y_2O_3$), strontium oxide (SrO), lanthanum oxide ($La_2O_3$), tantalum oxide ($Ta_2O_5$), barium oxide (BaO), titanium dioxide ($TiO_2$), zinc oxide (ZnO), ferric oxide ($Fe_2O_3$), tungsten trioxide ($WO_3$), copper oxide (CuO), copper peroxide ($CuO_2$), nickel oxide (NiO) and indium oxide ($In_2O_3$), and preferably includes $SnO_2$.

The chemi-capacitive sensor further includes a conductive wire, and the conductive wire may electrically connect the first electrode and the second electrode to each other.

The chemi-capacitive sensor may further include a capacitance measurement part, and the capacitance measurement part may be electrically connected to the conductive wire and to the lower electrode.

The capacitance measurement part is capable of measuring the capacitance between the conductive wire and the lower electrode.

The chemi-capacitive sensor is capable of detecting at least one selected from the group consisting of hexane, ammonia, acetone, benzene, ethanol, methanol, toluene and o-xylene.

The chemi-capacitive sensor is capable of detecting a gaseous chemical.

The chemi-capacitive sensor is capable of detecting a target chemical by measuring the frequency at which the maximum value of the capacitance change ratio is shown when measuring the capacitance at different frequencies.

$$\text{Capacitance change ratio} = (C - C_o)/C_o \quad \text{[Equation 1]}$$

In Equation 1,
$C_o$ is the baseline capacitance, and
$C$ is the capacitance when the detection part is exposed to the target chemical.

FIG. 1 schematically shows the process of manufacturing the chemi-capacitive sensor according to the present invention.

Hereinafter, a method of manufacturing a chemi-capacitive sensor of the present invention is described with reference to FIG. 1.

First, a lower electrode including a conductor is provided (step a).

Next, an insulation part including an insulator is formed on the lower electrode (step b).

Next, an upper electrode including a first electrode and a second electrode, spaced apart from the first electrode, is formed on the insulation part (step c).

Next, a detection part including at least one selected from the group consisting of a carbon nanomaterial and a metal-oxide-coated carbon nanomaterial is formed on the first electrode, the second electrode, and the insulation part between the first electrode and the second electrode (step d).

Here, step (d) may be performed in two steps.

Specifically, a suspension including a carbon nanomaterial is prepared by dispersing the carbon nanomaterial in a solvent (step d-1).

The solvent may include at least one selected from the group consisting of dimethylformamide (DMF), dimethyl sulfoxide (DMSO), N-methylpyrrolidone (NMP), dimethylacetamide (DMA), monomethylformamide (MMF) and monomethylacetamide (MMA), and preferably includes DMF.

Next, the suspension is applied on the first electrode, the second electrode, and the insulation part between the first electrode and the second electrode, thus forming a detection part including the carbon nanomaterial (step d-2).

Step (d-2) may include (d-2-1) applying the suspension on the first electrode, the second electrode, and the insulation part between the first electrode and the second electrode, and (d-2-2) forming a detection part by aligning the carbon nanomaterial contained in the applied suspension by applying a voltage to the applied suspension.

After step (d-2), step (d) may further include (d-3) applying droplets including a metal oxide precursor on the carbon nanomaterial applied on the insulation part, and (d-4) forming a detection part including a metal-oxide-coated carbon nanomaterial by oxidizing the metal oxide precursor contained in the droplets.

Moreover, the metal oxide precursor may be at least one precursor selected from the group consisting of tin oxide ($SnO_2$), silicon dioxide ($SiO_2$), aluminum oxide ($Al_2O_3$), magnesium oxide (MgO), calcium oxide (CaO), zirconium silicate ($ZrSiO_4$), zirconium dioxide ($ZrO_2$), hafnium silicate ($HfSiO_4$), hafnium dioxide ($HfO_2$), yttrium oxide ($Y_2O_3$), strontium oxide (SrO), lanthanum oxide ($La_2O_3$) tantalum oxide ($Ta_2O_5$), barium oxide (BaO) and titanium dioxide ($TiO_2$).

Finally, a conductive wire electrically connecting the first electrode and the second electrode to each other is formed (step e).

After step (e), providing a capacitance measurement part electrically connected to the conductive wire and to the lower electrode may be further included.

EXAMPLES

A better understanding of the present invention will be given of the following examples. However, these examples are merely set forth to illustrate the present invention, and are not to be construed as limiting the scope of the present invention.

Example 1: Chemi-Capacitive Sensor Having Vertical Structure Including SWNTs

A $SiO_2$ layer having a thickness of 300 nm was formed through chemical vapor deposition at 1,100° C. on a p-type silicon substrate doped at a high concentration, serving as a lower electrode, after which 20-nm-thick chromium (Cr) and 180-nm-thick gold (Au) were sequentially deposited on the $SiO_2$ layer using a standard lift-off technique under fixed conditions of an electrode width of 200 μm and a gap between electrodes of 3 μm to form two Au/Cr electrodes, thus forming an upper electrode including a first electrode and a second electrode.

Carboxylated SWNTs (10 μg/ml, SWNT-COOH 80-90% purity, Carbon Solution, Inc. (Riverside, Calif.)) were ultrasonically dispersed in N,N-dimethylformamide (DMF), followed by centrifugation at 31,000 G for 90 min, thus preparing a uniform SWNT suspension.

For alignment of the SWNT network, 0.2 μl of the SWNT suspension was placed on Au of the two Au/Cr electrodes while applying 0.36 vrms at a frequency of 4 MHz, after which the formed SWNT network was washed with deionized water and dried with nitrogen gas. In order to reduce contact resistance between the SWNT network and the electrode and remove the DMF residue, annealing at 300° C. for 1 hr in $N_2$ containing 5% $H_2$ in a reducing environment was performed, thus manufacturing a pre-device.

The Au upper surfaces of the two Au/Cr electrodes of the pre-device were connected using a conductive wire, and the conductive wire and the lower surface of the p-type silicon substrate were connected to an LCR meter (Hioki, HiTester 3532-50), thereby manufacturing a chemi-capacitive sensor having a vertical structure including SWNTs.

Example 2: Chemi-Capacitive Sensor Having Vertical Structure Including Tin-Oxide-($SnO_2$)-Coated SWNTs A $SiO_2$ layer having a thickness of 300 nm was formed through chemical vapor deposition at 1,100° C. on a p-type silicon substrate doped at a high concentration, serving as a lower electrode, after which 20-nm-thick chromium (Cr) and 180-nm-thick gold (Au) were sequentially deposited on the SiO$_2$ layer using a standard lift-off technique under fixed conditions of an electrode width of 200 µm and a gap between electrodes of 3 µm to form two Au/Cr electrodes, thus forming an upper electrode including a first electrode and a second electrode.

Carboxylated SWNTs (10 µg/ml, SWNT-COOH 80-90% purity, Carbon Solution, Inc. (Riverside, Calif.)) were ultrasonically dispersed in N,N-dimethylformamide (DMF), followed by centrifugation at 31,000 G for 90 min, thus preparing a uniform SWNT suspension.

For alignment of the SWNT network, 0.2 µl of the SWNT suspension was placed on Au of the two Au/Cr electrodes while applying 0.36 vrms at a frequency of 4 MHz, after which the formed SWNT network was washed with deionized water and dried with nitrogen gas.

100 mM NaNO$_3$ (≥99.0%, Sigma-Aldrich, MO), 75 mM HNO$_3$ (70%, Sigma-Aldrich, MO), and 20 mM SnCl$_2$·5H$_2$O (≥98%, Sigma-Aldrich, MO) were mixed, added with concentrated HCl (37%, Sigma-Aldrich, MO) so that the pH thereof was adjusted to 1.3, and then aged for 12 hr, thus preparing a solution.

3 µl of the above solution was dropped on the SWNT network to form droplets, and platinum and Ag/AgCl wires were positioned inside the droplets using a micropositioner, thus forming an electrochemical cell. Here, the SWNT network serves as a working electrode, the platinum serves as a counter electrode, the Ag/AgCl serves as a reference electrode, and the solution serves as an electrolyte.

Linear sweep voltammetry (LSV) and chronoamperometry (CA) were performed at room temperature using a potentiostat/galvanostat (EG & G, Princeton Applied Research 263A Potentiostat/Galvanostat, NY).

During the LSV experiment, the potential was scanned at a scan rate of 10 mVs$^{-1}$ from +100 mV open circuit potential to −1.0 V (vs. Ag/AgCl), and in the CA experiment, a fixed cathode potential (−0.4V solution vs. reference electrode) was applied for a predetermined period of time, and thus the SWNTs were coated with SnO$_2$ through deposition. After the electrochemical assisted deposition process, the SnO$_2$-coated SWNT network was washed with deionized water and annealed at 400° C. for 4 hr in N$_2$, thus manufacturing a pre-device.

The Au upper surfaces of the two Au/Cr electrodes of the pre-device were connected using a conductive wire, and the conductive wire and the lower surface of the p-type silicon substrate were connected to an LCR meter (Hioki, HiTester 3532-50), thereby manufacturing a chemi-capacitive sensor having a vertical structure including SnO$_2$-cated SWNTs.

Comparative Example 1: Chemi-Capacitive Sensor Having Horizontal Structure

A pre-device was manufactured in the same manner as in Example 1.

The Au upper surfaces of the two Au/Cr electrodes of the pre-device were connected using a conductive wire to an LCR meter (Hioki, HiTester 3532-50), thereby manufacturing a chemi-capacitive sensor having a horizontal structure.

TEST EXAMPLES

Test Example 1: SEM (Scanning Electron Microscope) Analysis

Figure 3:
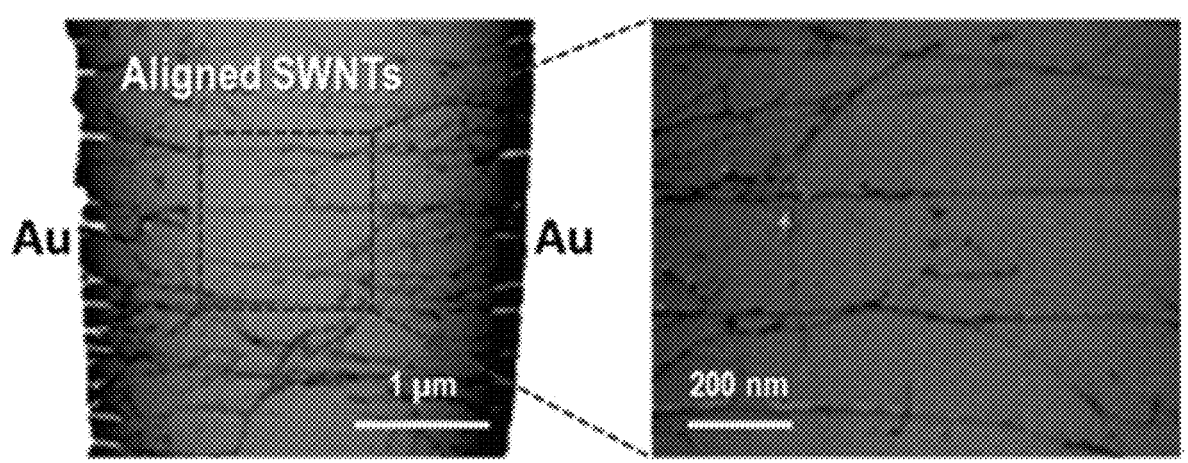
FIG. 3 shows scanning electron microscope (SEM) images at low and high magnifications of the SWNT network of a chemi-capacitive sensor having a vertical structure manufactured in Example 1.

FIG. 3 shows SEM images at low and high magnifications of the SWNT network of the chemi-capacitive sensor having a vertical structure manufactured in Example 1. With reference to FIG. 3, it can be confirmed that SWNTs were aligned across a 3 µm gap between two electrodes located on the SiO$_2$/Si substrate.

Figure 4:
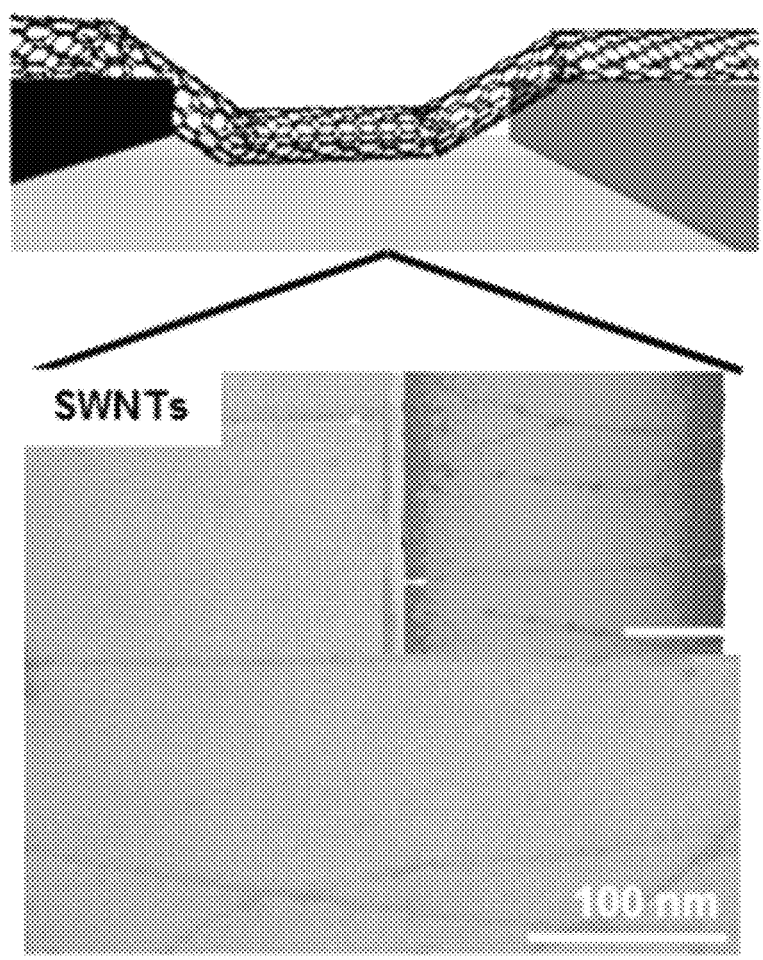
FIG. 4 schematically shows the configuration of the SWNT network of the chemi-capacitive sensor having a vertical structure manufactured in Example 1, and shows SEM images at low and high magnifications of the SWNT network, in which the top right SEM image is an image at a low magnification.
Figure 5:
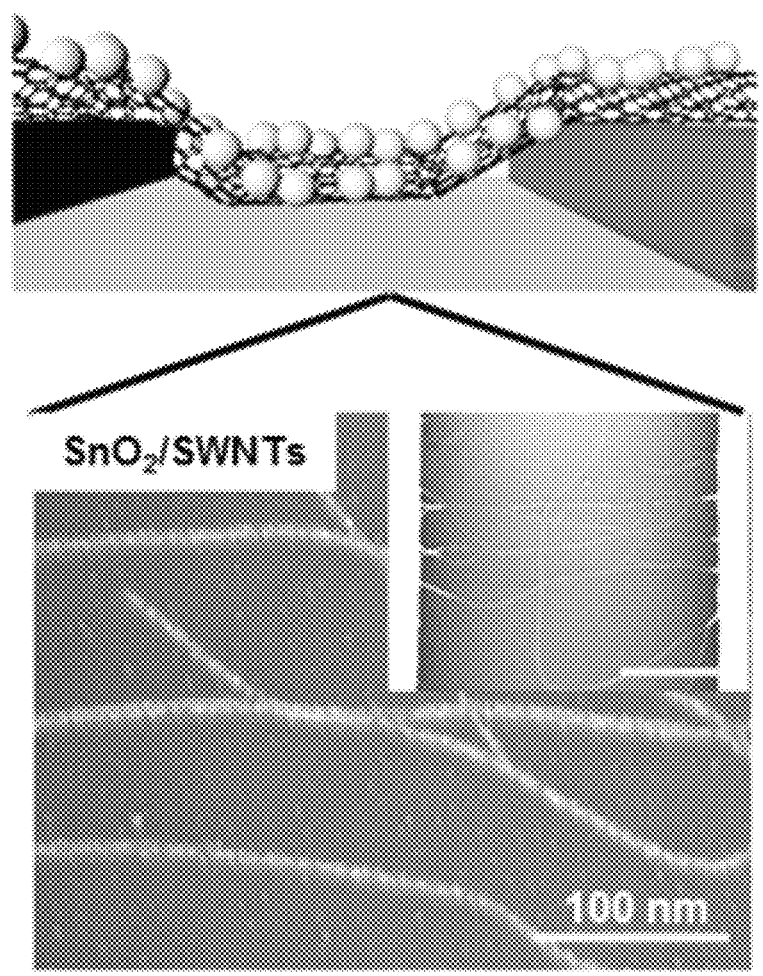
FIG. 5 schematically shows the configuration of the $SnO_2$-coated SWNT network of the chemi-capacitive sensor having a vertical structure manufactured in Example 2, and shows SEM images at low and high magnifications of the $SnO_2$-coated SWNT network, in which the top right SEM image is an image at a low magnification.

FIGS. 4 and 5 schematically show the SWNT network and the SnO$_2$-coated SWNT network of the chemi-capacitive sensors having vertical structures manufactured in Examples 1 and 2, respectively, and show SEM images at low and high magnifications thereof. In the SEM images of FIGS. 4 and 5, the top right images are images at low magnifications. With reference to FIG. 4, it can be confirmed that the SWNT network was aligned between the electrodes, and with reference to FIG. 5, it can be confirmed that the radius of the network was increased by coating the aligned SWNT network with SnO$_2$ through the electrochemical process.

Test Example 2: Analysis of Capacitance Change Ratio Depending on Frequency in Presence of Hexane and Ammonia (NH$_3$) Vapors at Various Concentrations The capacitance and resistance of the chemical sensors were measured using an LCR meter in the frequency range of 100 Hz-3 MHz at room temperature when exposed to analytes at different concentrations.

Figure 6A:
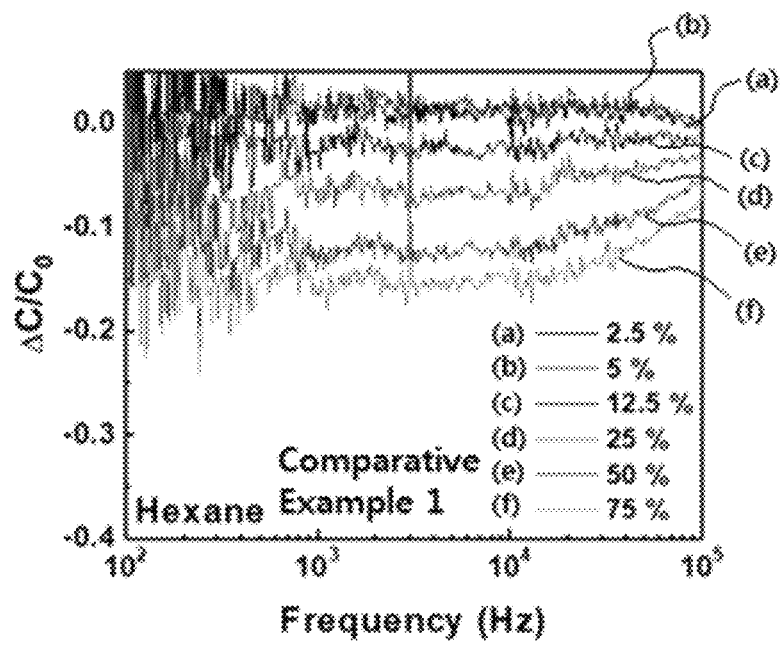
FIG. 6A is a graph showing a capacitance change ratio depending on the frequency of the chemical sensor manufactured in Comparative Example 1 in the presence of hexane vapor at various concentrations.
Figure 6B:
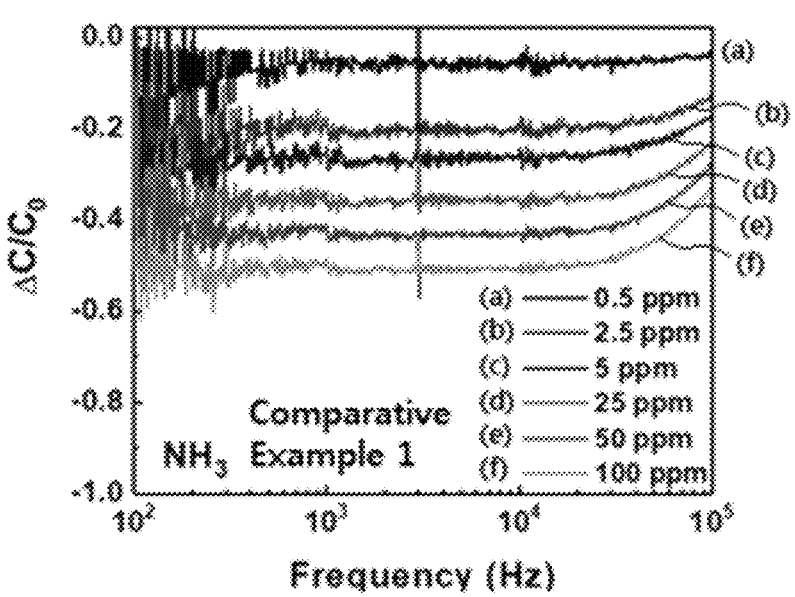
FIG. 6B is a graph showing a capacitance change ratio depending on the frequency of the chemical sensor manufactured in Comparative Example 1 in the presence of ammonia ($NH_3$) vapor at various concentrations.
Figure 7A:
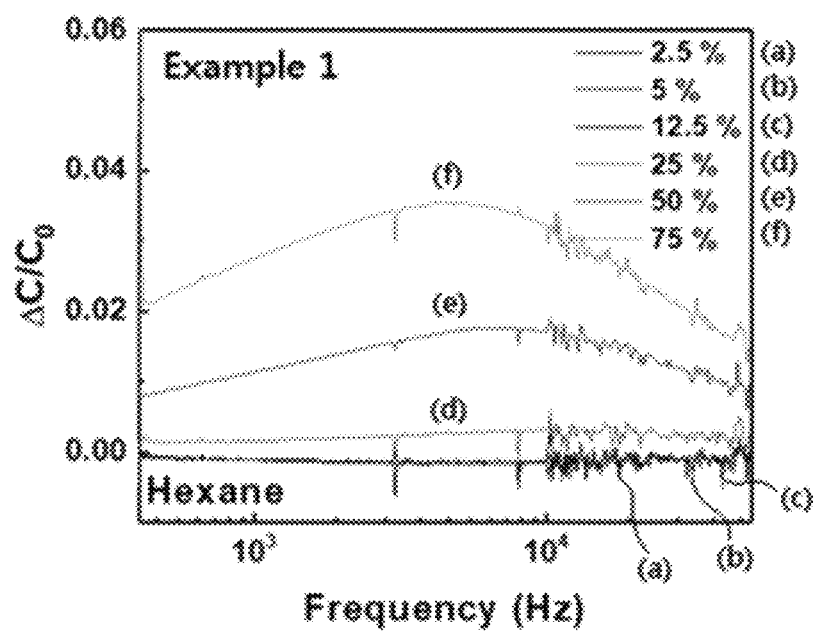
FIG. 7A is a graph showing a capacitance change ratio depending on the frequency of the chemical sensor manufactured in Example 1 in the presence of hexane vapor at various concentrations.
Figure 7B:
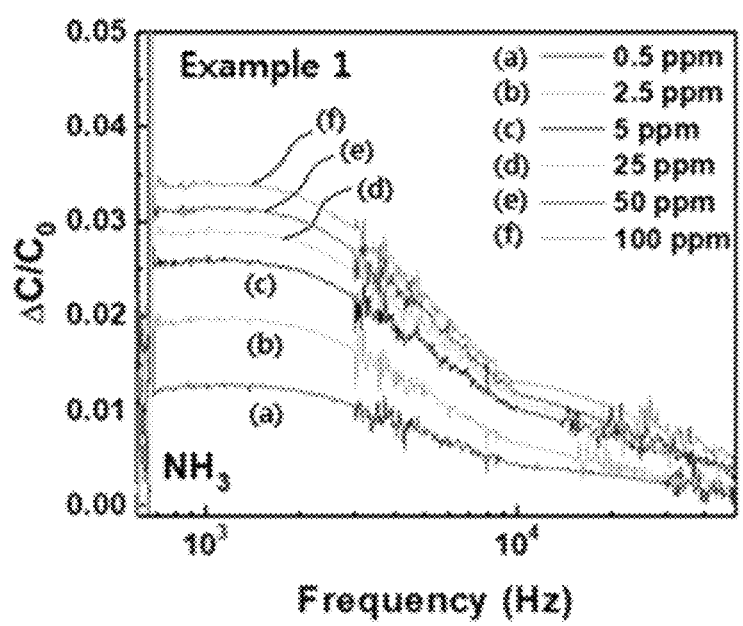
FIG. 7B is a graph showing a capacitance change ratio depending on the frequency of the chemical sensor manufactured in Example 1 in the presence of ammonia ($NH_3$) vapor at various concentrations.

FIGS. 6A and 6B are graphs showing the capacitance change ratio depending on the frequency of the chemical sensor manufactured in Comparative Example 1 in the presence of hexane and ammonia (NH$_3$) vapors at various concentrations, respectively, and FIGS. 7A and 7B are graphs showing the capacitance change ratio depending on the frequency of the chemical sensor manufactured in Example 1 in the presence of hexane and ammonia (NH$_3$) vapors at various concentrations, respectively.

The capacitance change ratio ($\Delta C/C_o$) is defined as the relative change in capacitance, $[(C-C_o)/C_o] \times 100\%$, in which $C_o$ is the baseline capacitance, that is, the capacitance when not exposed to analytes (e.g. target gas) but only to air, and C is the capacitance when exposed to analytes.

With reference to FIGS. 6A, 6B, 7A and 7B, both the chemical gas sensors of Example 1 and Comparative Example 1 have high noise levels in the low frequency range due to the relationship between frequency and noise. It can be confirmed that in the chemical gas sensor having a horizontal structure of Comparative Example 1, the detection frequency was not related to the concentration of analytes (hexane and NH$_3$), but that the chemical gas sensor having a vertical structure of Example 1 had different detection frequencies and was dependent on the concentration of the analytes. As shown in FIGS. 5A and 5B, the maximum capacitance response for hexane vapor was observed in the 2-15 kHz frequency range and the maximum response for NH$_3$ vapor was observed in the 0.6-3 kHz frequency range.

Moreover, the capacitance change ratio of the chemical gas sensors of Example 1 and Comparative Example 1 decreased in the high frequency range. In the low frequency range, there is enough time for the carrier to respond, and the capacitance is greatly affected. On the other hand, in the higher frequency range, the change in the electric field becomes too fast for the carrier to be modulated, and the capacitance is not greatly affected by the analyte, so it does not contribute to a change in capacitance. In the response of the chemical gas sensor having a vertical structure of Example 1, the capacitance change ratio is relatively low, but the signal-to-noise ratio is high, compared to the response of the chemical gas sensor having a horizontal structure of Comparative Example 1.

Figure 8A:
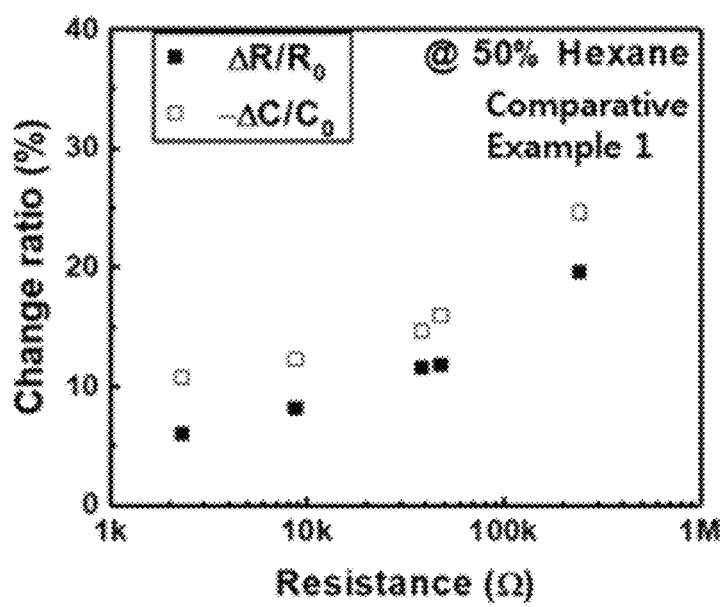
FIG. 8A is a graph showing the maximum response dependence on the resistance of the SWNTs of the chemical sensor manufactured in Comparative Example 1 in the presence of 50% hexane vapor.
Figure 8B:
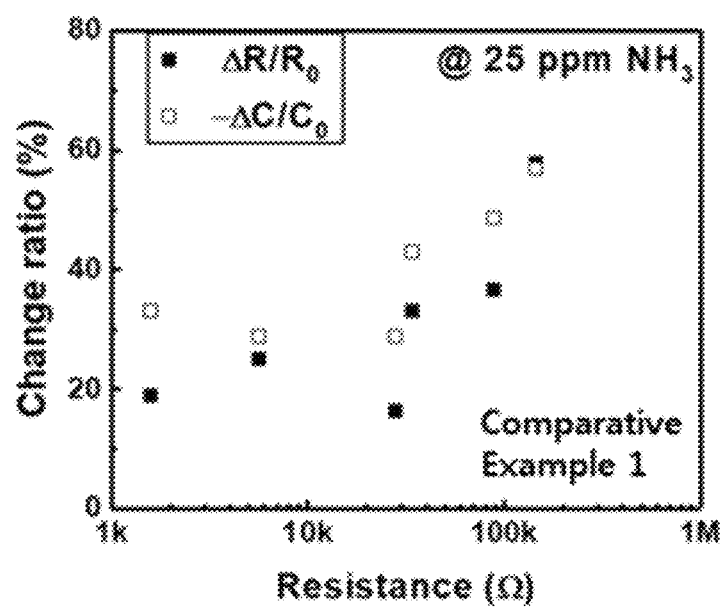
FIG. 8B is a graph showing the maximum response dependence on the resistance of the SWNTs of the chemical sensor manufactured in Comparative Example 1 in the presence of 25 ppm ammonia ($NH_3$) vapor.

Test Example 3: Comparison of Capacitance Change Ratio Depending on Resistance of Sensor FIGS. 8A and 8B are graphs showing the maximum response dependence on the resistance of the SWNTs of the chemical sensor manufactured in Comparative Example 1 in the presence of 50% hexane vapor and 25 ppm ammonia ($NH_3$) vapor, respectively. With reference to FIGS. 8A and 8B, it can be confirmed that the capacitance change ratio was slightly larger than the resistance change ratio but that the capacitance change ratio followed the same trend as the resistance change ratio.

Figure 9:
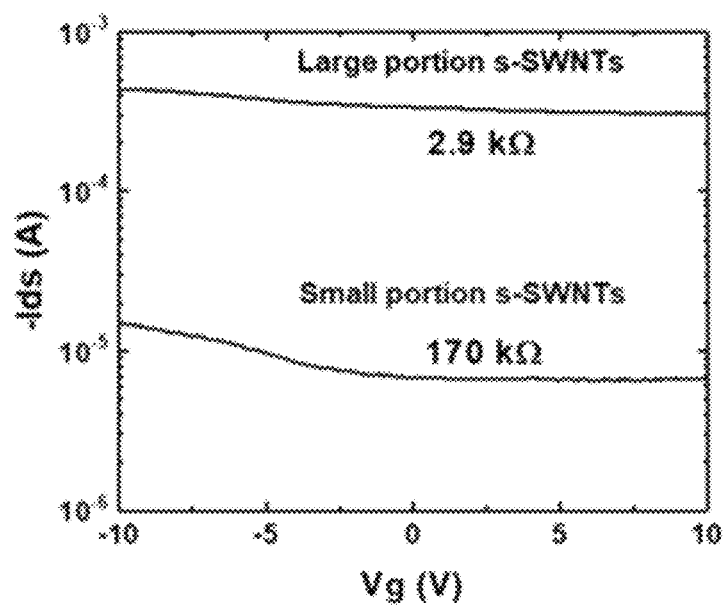
FIG. 9 is a graph showing the dependence of the drain current $I_D$ on the gate voltage $V_g$.
Figure 10:
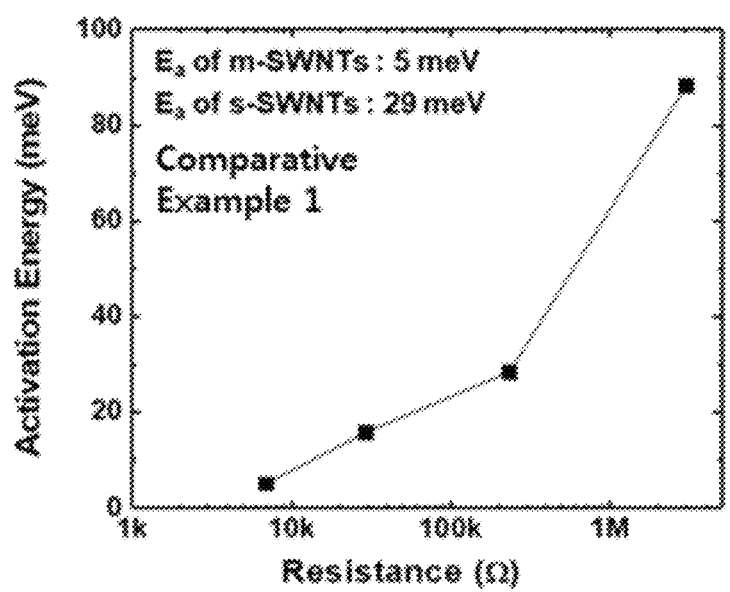
FIG. 10 is a graph showing the relationship between activation energy and resistance in the chemical sensor manufactured in Comparative Example 1.

As the resistance of the device increases, the capacitance and resistance change ratios increase due to a large portion of the semiconducting SWNTs (s-SWNTs) in the device (FIG. 9). Due to the presence of the Schottky barrier, the resistance of the metal-metal SWNT junction is lower than that of the metal-semiconductor SWNT junction. This can be explained by the heat activation energy $E_a$ of the device and the transfer characteristics thereof, as shown in FIG. 10. The heat activation energy is calculated by the Arrhenius plot, and the Arrhenius equation is as follows.

$$\frac{1}{\rho} = Ce^{-\frac{E_a}{kT}}$$

Here, $E_a$ is the activation energy, $\rho$ is the specific resistance, C is the constant, k is the gas constant, and T is the Kelvin temperature.

As the resistance of the chemical gas sensor having a horizontal structure of Comparative Example 1 increases, the heat activation energy $E_a$ value of the aligned SWNTs steadily increases. The $E_a$ values of metallic SWNTs (m-SWNTs) and s-SWNTs were previously reported to be approximately 5 meV and 29 meV, respectively. Therefore, the SWNT network having high resistance includes many s-SWNTs, which leads to a high $E_a$ value of the device.

Figure 11A:
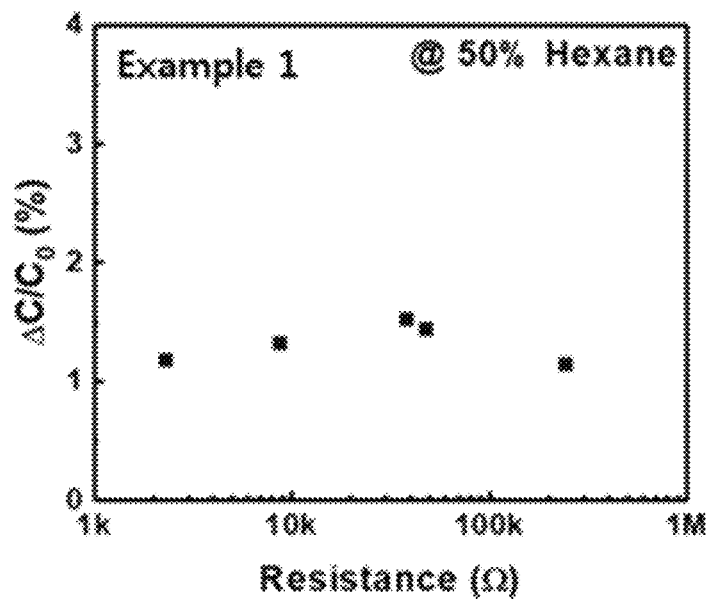
FIG. 11A is a graph showing the maximum response dependence on the resistance of the SWNTs of the chemical sensor manufactured in Example 1 in the presence of 50% hexane vapor.
Figure 11B:
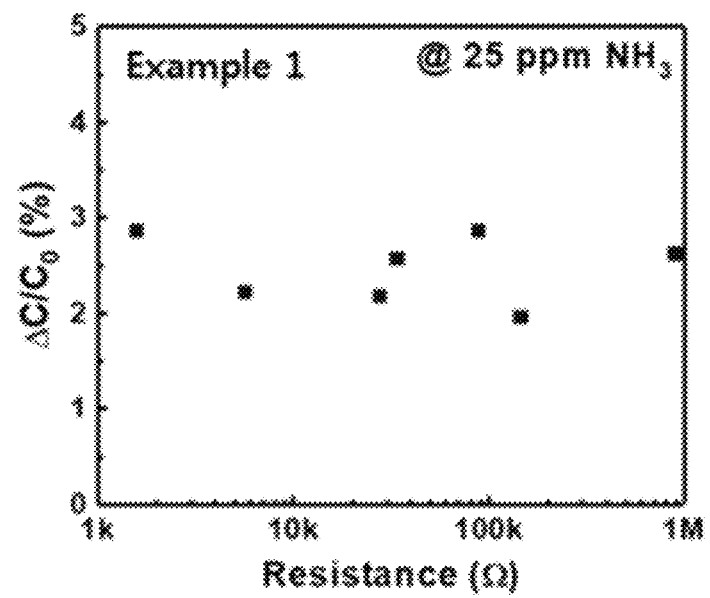
FIG. 11B is a graph showing the maximum response dependence on the resistance of the SWNTs of the chemical sensor manufactured in Example 1 in the presence of 25 ppm ammonia ($NH_3$) vapor.

FIGS. 11A and 11B are graphs showing the maximum response dependence on the resistance of the SWNTs of the chemical sensor manufactured in Example 1 in the presence of 50% hexane vapor and 25 ppm ammonia ($NH_3$) vapor, respectively. With reference to FIGS. 11A and 11B, it can be confirmed that the capacitance change ratio of the chemical gas sensor having a vertical structure of Example 1 was independent of the resistance of the device.

In order to explain the foregoing, the resistance of the device was determined, after which the gap between the SWNTs was measured using an atomic force microscope. This is because the device resistance is related to the distance between neighboring SWNTs. The distance between SWNTs was determined to be 1 to 40 nm. In the chemical gas sensor having a vertical structure of Example 1, the SWNT capacitance is significantly lower than the capacitance at the contact and the capacitance of the gate ($SiO_2$). Therefore, the total capacitance of the chemical gas sensor is greatly influenced by the capacitance value of the gate, and the capacitance value of the gate is dominated by the capacitances of SWNTs and air around SWNTs.

$$C_{Total} = \left( \frac{1}{C_{contact}} + \frac{1}{C_Q} + \frac{1}{C_g} \right)^{-1} \quad (1)$$

The gate capacitance was calculated using the following Equation (2).

$$C_g = 1\left( \frac{2}{\varepsilon} \log \frac{\Lambda_0}{R_T} \frac{\sin\pi 2d}{\pi} + C_Q^{-1} \right)^{-1} \Lambda_0^{-1} \quad (2)$$

Here, $\varepsilon$ is the dielectric constant of the gate dielectric material, $\Lambda_0$ is the average distance between neighboring tubes, $R_T$ is the tube radius, d is the thickness of the insulator, and $C_Q^{-1}$ is the quantum capacity. The dielectric constant $\varepsilon$ of the gate material may be expressed as follows.

$$\varepsilon = \frac{\varepsilon_d + \varepsilon_a}{2} \quad (3)$$

Here, $\varepsilon_d$ is the dielectric constant of the dielectric material and $\varepsilon_a$ is the dielectric constant of the air.

Figure 12:
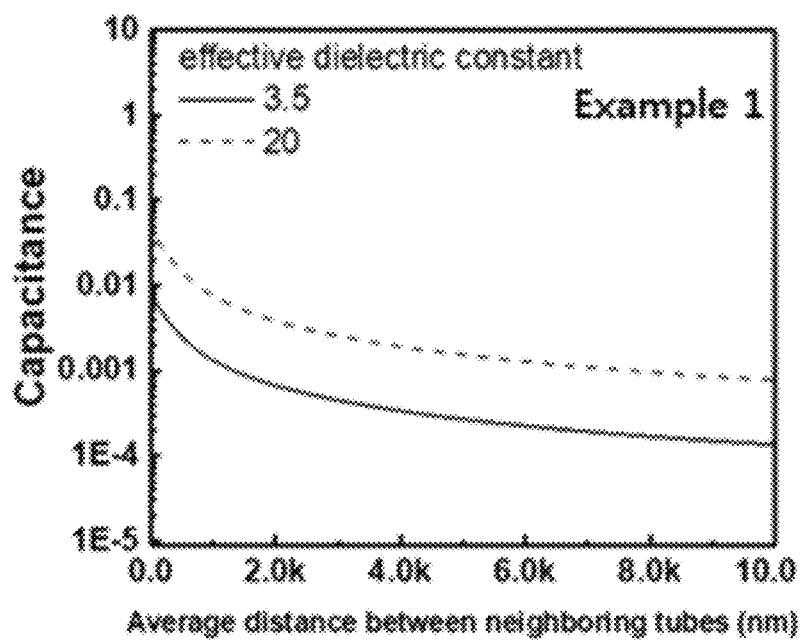
FIG. 12 is a graph showing the relationship between capacitance and average distance between neighboring SWNTs in the chemical sensor manufactured in Example 1.
Figure 13:
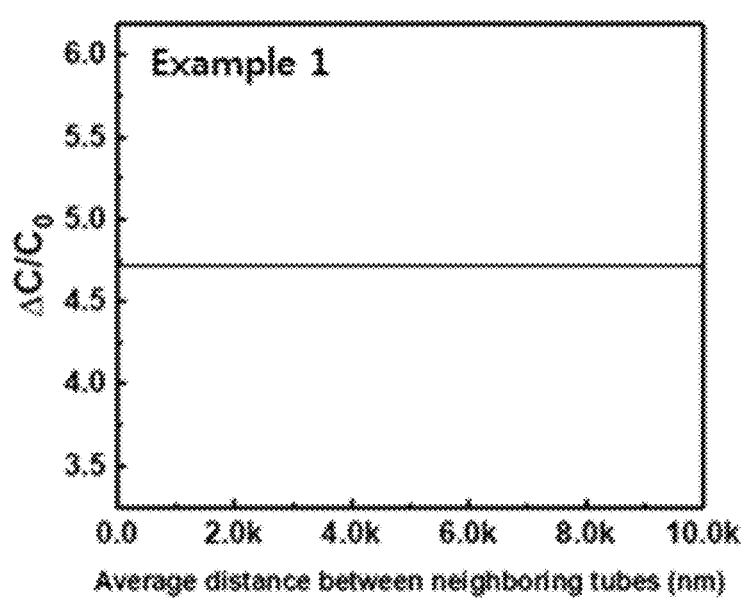
FIG. 13 is a graph showing the relationship between the capacitance change ratio and the average distance between neighboring SWNTs in the chemical sensor manufactured in Example 1.

As given in Equation (3) above, the effective dielectric constant takes into account the dielectric constant of the dielectric material (SWNTs in this experiment) and air. Consequently, the capacitance of the chemical gas sensor having a vertical structure of Example 1 may vary depending on the effective dielectric constant, as shown in FIG. 12. The capacitance change ratio depending on the average distance between neighboring tubes is shown in FIG. 13. With reference to FIG. 13, it can be confirmed that the capacitance change ratio of the chemical gas sensor having a vertical structure of Example 1 was independent of the distance between neighboring tubes.

Figure 14:
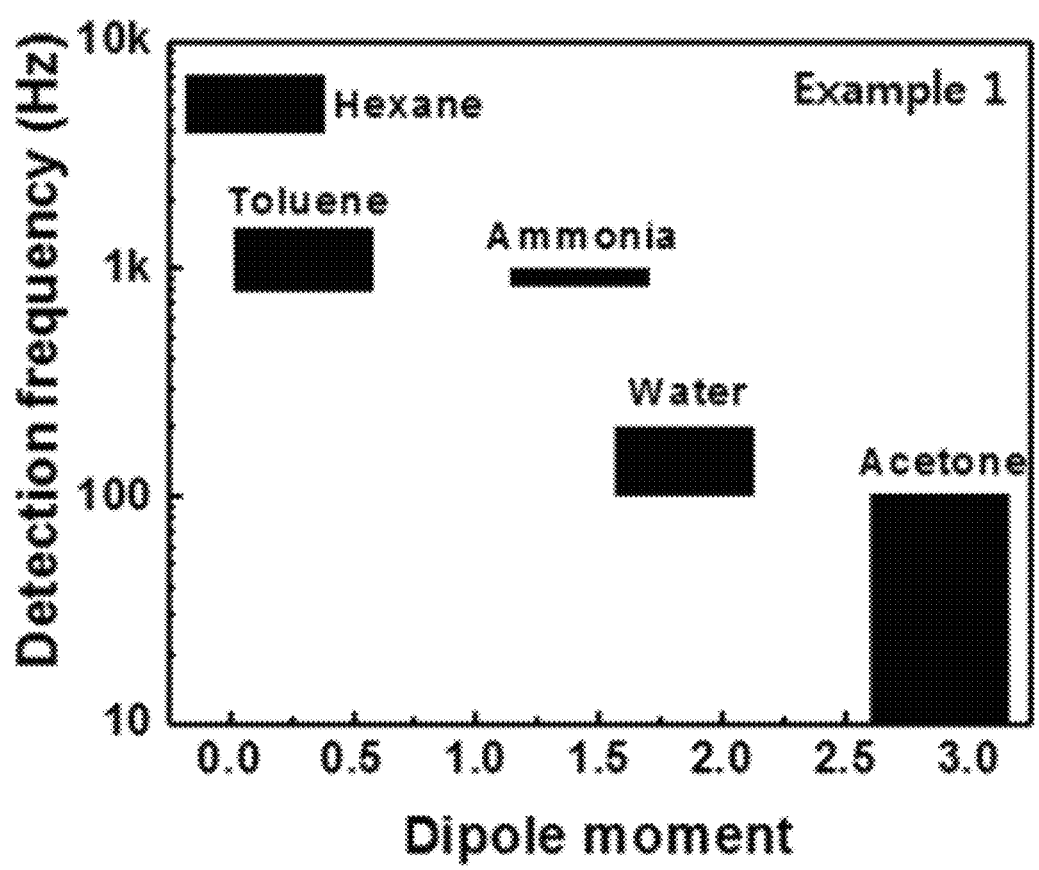
FIG. 14 is a graph showing the relationship between the detection frequency of the chemical sensor manufactured in Example 1 and the dipole moment of various chemical vapors.

Test Example 4: Analysis of Relationship Between Detection Frequency and Dipole Moment of Analyte FIG. 14 is a graph showing the relationship between the detection frequency of the chemical sensor manufactured in Example 1 and the dipole moment of various chemical vapors. With reference to FIG. 14, it can be confirmed that the detection frequency decreased with an increase in the dipole moment of the analyte. Polarization is interpreted as the average dipole moment per unit volume of a substance; that is, it is possible to increase polarization by increasing the dipole moment of analytes having the same unit volume. However, since polarization makes it difficult to follow the electric field at high frequency, there is no response in that range. Acetone has a higher dipole moment than other analytes. Thus, there will be no change in the high frequency range, in contrast to hexane, having a low dipole moment. Here, the chemi-capacitive sensor of Example 1 of the present invention has a different frequency detection range for each analyte, and thus can selectively detect various gas species through the intrinsic dipole moment of the analyte.

Figure 15:
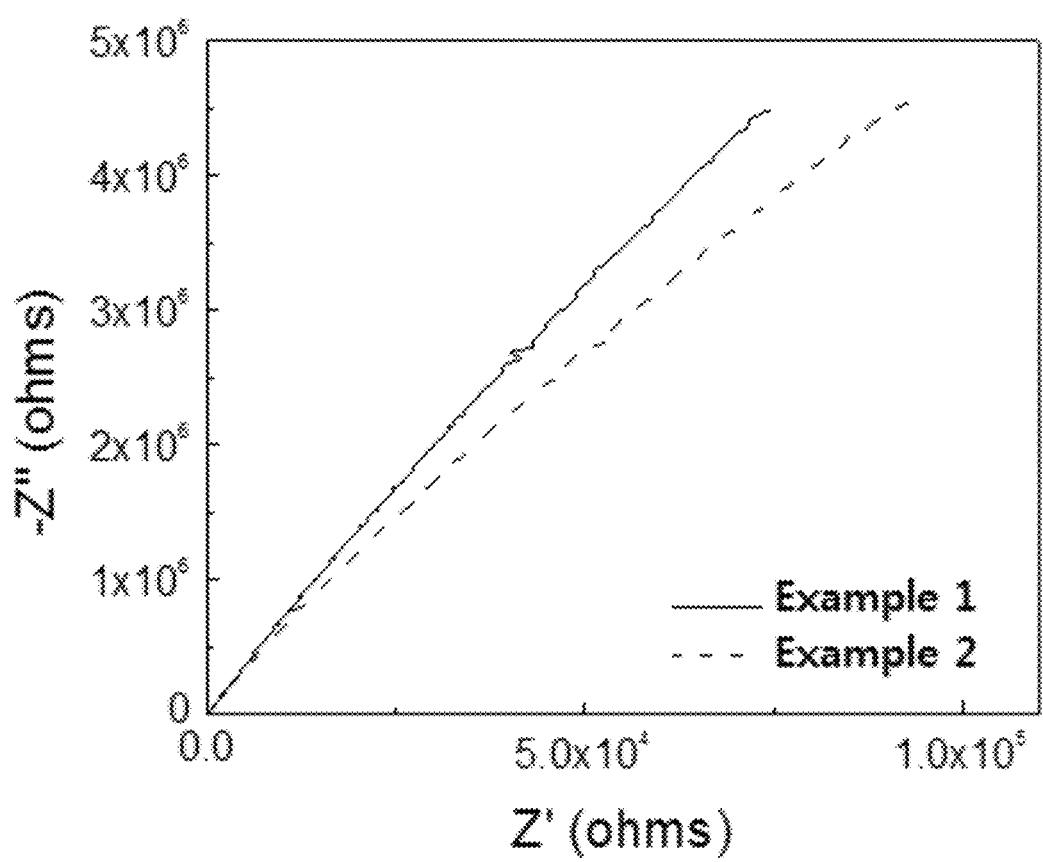
FIG. 15 is a graph showing the relationship between Z' and Z" in the chemical sensors manufactured in Example 1 and Example 2.

Test Example 5: Comparison of Chemical Sensor Including SWNTs and Chemical Sensor Including $SnO_2$-Coated SWNTs The relationship between Z' and Z" of the chemical sensors manufactured in Example 1 and Example 2 was measured using an impedance meter, and the results thereof are shown in FIG. 15. With reference to FIG. 15, it can be confirmed that the impedance values of the chemical sensors manufactured in Example 1 and Example 2 were almost the same.

Figure 16:
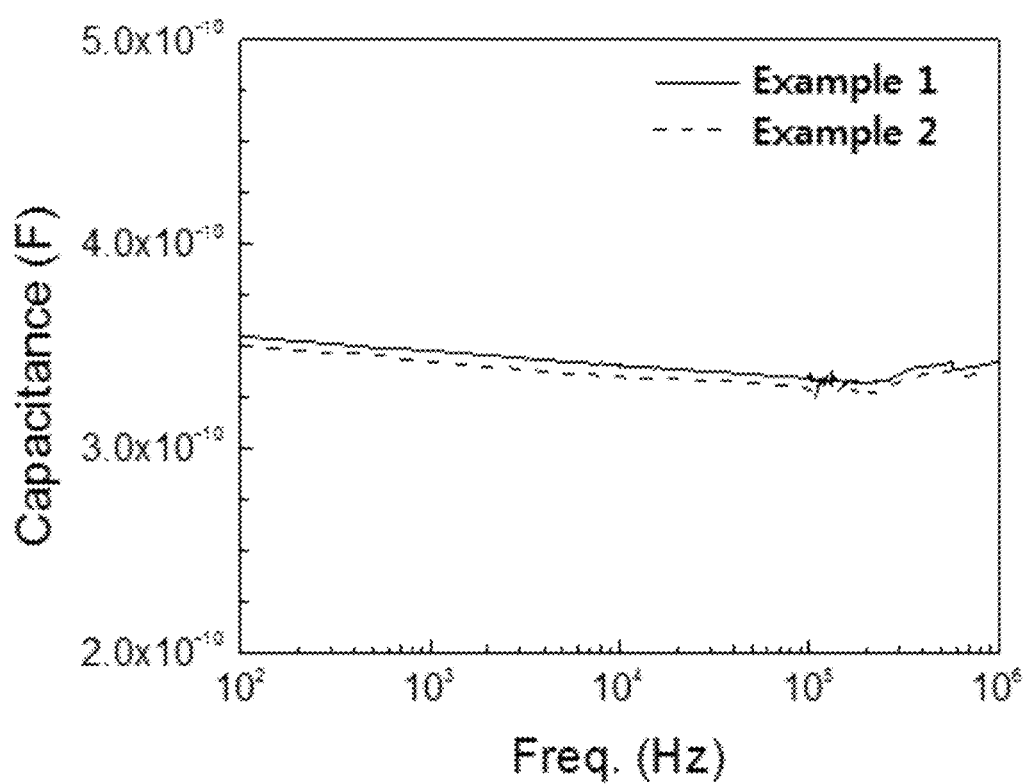
FIG. 16 is a graph showing capacitance depending on the frequency of the chemical sensors manufactured in Example 1 and Example 2.

The capacitance was calculated based on the above impedance values, and the results thereof are shown in FIG. 16. With reference to FIG. 16, it can be confirmed that the capacitance of the chemical sensor of Example 1 including SWNTs was almost the same as that of the chemical sensor of Example 2 including $SnO_2$-coated SWNTs.

Although preferred embodiments of the present invention have been disclosed for illustrative purposes, those skilled in the art will appreciate that diverse variations and modifications are possible through addition, alteration, deletion, etc. of elements, without departing from the spirit or scope of the invention. For example, respective elements described in an integrated form may be discretely used, or discrete elements may be used in the state of being combined. The scope of the invention is defined by the claims below rather than the aforementioned detailed description, and all changes or modified forms that are capable of being derived from the meaning, range, and equivalent concepts of the appended claims should be construed as being included in the scope of the present invention.

What is claimed is:

1. A chemi-capacitive sensor, comprising:
   a lower electrode comprising a conductor;
   an insulation part formed on the lower electrode and comprising an insulator;
   an upper electrode disposed on the insulation part and comprising a first electrode and a second electrode spaced apart from the first electrode; and
   a detection part disposed on the first electrode, the second electrode, and the insulation part between the first electrode and the second electrode and comprising at least one selected from the group consisting of a carbon nanomaterial and a metal-oxide-coated carbon nanomaterial,
   wherein the chemi-capacitive sensor detects a target chemical by measuring a frequency at which a maximum value of a capacitance change ratio is shown when measuring capacitance at different frequencies:
   wherein the Capacitance change ratio=$(C-C_o)/C_o$ wherein:
   $C_o$ is a baseline capacitance, and
   $C$ is a capacitance when the detection part is exposed to the target chemical.

2. The chemi-capacitive sensor of claim 1, wherein the chemi-capacitive sensor further comprises a conductive wire, and
   the conductive wire electrically connects the first electrode and the second electrode to each other.

3. The chemi-capacitive sensor of claim 2, wherein the chemi-capacitive sensor further comprises a capacitance measurement part, and
   the capacitance measurement part is electrically connected to the conductive wire and to the lower electrode.

4. The chemi-capacitive sensor of claim 1, wherein the detection part comprises a network having the carbon nanomaterial, and
   the network comprises the carbon nanomaterial aligned in a direction from any one electrode of the first electrode and the second electrode toward a remaining one thereof.

5. The chemi-capacitive sensor of claim 1, wherein the carbon nanomaterial comprises at least one selected from the group consisting of carbon nanotubes and carbon nanowires.

6. The chemi-capacitive sensor of claim 5, wherein the carbon nanotubes comprise at least one selected from the group consisting of single-walled carbon nanotubes, double-walled carbon nanotubes, and multiple-walled carbon nanotubes.

7. The chemi-capacitive sensor of claim 1, wherein the carbon nanomaterial comprises, on a surface thereof, at least one functional group selected from the group consisting of a hydroxyl group (—OH), a carbonyl group (—C=O), a carboxyl group (—COOH) and an amino group (—NH$_2$).

8. The chemi-capacitive sensor of claim 1, wherein the metal oxide comprises at least one selected from the group consisting of tin oxide ($SnO_2$), silicon dioxide ($SiO_2$), aluminum oxide ($Al_2O_3$), magnesium oxide (MgO), calcium oxide (CaO), zirconium silicate ($ZrSiO_4$), zirconium dioxide ($ZrO_2$), hafnium silicate ($HfSiO_4$), hafnium dioxide ($HfO_2$), yttrium oxide ($Y_2O_3$), strontium oxide (SrO), lanthanum oxide ($La_2O_3$), tantalum oxide ($Ta_2O_5$), barium oxide (BaO), titanium dioxide ($TiO_2$), zinc oxide (ZnO), ferric oxide ($Fe_2O_3$), tungsten trioxide ($WO_3$), copper oxide (CuO), copper peroxide ($CuO_2$), nickel oxide (NiO) and indium oxide ($In_2O_3$).

9. The chemi-capacitive sensor of claim 1, wherein the chemi-capacitive sensor detects at least one selected from the group consisting of hexane, ammonia, acetone, benzene, ethanol, methanol, toluene and o-xylene.

10. The chemi-capacitive sensor of claim 1, wherein the chemi-capacitive sensor detects a gaseous chemical.

11. The chemi-capacitive sensor of claim 1, wherein the conductor of the lower electrode comprises at least one selected from the group consisting of p-type silicon, n-type silicon, Au, Al, Ag, Be, Bi, Co, Cu, Cr, Cd, Fe, Ga, Hf, In, Ir, Mn, Mo, Mg, Ni, Nb, Pb, Pd, Pt, Rh, Re, Ru, Sb, Sn, Ta, Te, Ti, V, W, Zr and Zn.

12. The chemi-capacitive sensor of claim 1, wherein the insulator comprises at least one selected from the group consisting of silicon dioxide ($SiO_2$), aluminum oxide ($Al_2O_3$), silicon nitride ($Si_3N_4$), silicon oxynitride (SiON), magnesium oxide (MgO), calcium oxide (CaO), zirconium silicate ($ZrSiO_4$), zirconium dioxide ($ZrO_2$), hafnium silicate ($HfSiO_4$), hafnium dioxide ($HfO_2$), yttrium oxide ($Y_2O_3$), strontium oxide (SrO), lanthanum oxide ($La_2O_3$), tantalum oxide ($Ta_2O_5$), barium oxide (BaO) and titanium dioxide ($TiO_2$).

13. The chemi-capacitive sensor of claim 1, wherein the first electrode and the second electrode each independently comprise a chromium layer and a gold layer, in which chromium and gold are sequentially stacked, the chromium layer contacting the insulation part and the gold layer contacting the detection part.

14. The chemi-capacitive sensor of claim 1, wherein a distance between the first electrode and the second electrode is 1 to 10,000 µm.

15. A method of manufacturing a chemi-capacitive sensor, comprising:
   (a) providing a lower electrode comprising a conductor;
   (b) forming an insulation part comprising an insulator on the lower electrode;
   (c) forming an upper electrode comprising a first electrode and a second electrode spaced apart from the first electrode on the insulation part;
   (d) forming a detection part comprising at least one selected from the group consisting of a carbon nanomaterial and a metal-oxide-coated carbon nanomaterial on the first electrode, the second electrode, and the insulation part between the first electrode and the second electrode; and (e) forming a conductive wire that electrically connects the first electrode and the second electrode to each other, wherein the chemi-capacitive sensor detects a target chemical by measuring a frequency at which a maximum value of a capacitance change ratio is shown when measuring capacitance at different frequencies:

wherein the

Capacitance change ratio=$(C-C_o)/C_o$ wherein:

$C_o$ is a baseline capacitance, and

C is a capacitance when the detection part is exposed to the target chemical.

16. The method of claim 15, further comprising providing a capacitance measurement part electrically connected to the conductive wire and to the lower electrode, after step (e).

17. The method of claim 15, wherein step (d) comprises:

(d-1) preparing a suspension comprising the carbon nanomaterial by dispersing the carbon nanomaterial in a solvent; and (d-2) forming the detection part comprising the carbon nanomaterial by applying the suspension on the first electrode, the second electrode, and the insulation part between the first electrode and the second electrode.

18. The method of claim 17, wherein step (d-2) comprises:

(d-2-1) applying the suspension on the first electrode, the second electrode, and the insulation part between the first electrode and the second electrode; and (d-2-2) forming the detection part by aligning the carbon nanomaterial contained in the applied suspension by applying a voltage to the applied suspension.

19. The method of claim 17, wherein step (d) further comprises, after step (d-2):

(d-3) applying droplets comprising a metal oxide precursor on the carbon nanomaterial applied on the insulation part; and (d-4) forming the detection part comprising a metal-oxide-coated carbon nanomaterial by oxidizing the metal oxide precursor contained in the droplets.

* * * * *